United States Patent [19]

Laakmann

[11] Patent Number: 5,602,865
[45] Date of Patent: Feb. 11, 1997

[54] RF-EXCITED GAS LASER SYSTEM

[75] Inventor: Peter Laakmann, Bothell, Wash.

[73] Assignee: Synrad, Inc., Mukilteo, Wash.

[21] Appl. No.: 557,839

[22] Filed: Nov. 14, 1995

[51] Int. Cl.$^6$ .................................................. H01S 3/097
[52] U.S. Cl. .............................. 372/82; 372/81; 372/38
[58] Field of Search .............................. 372/82, 34, 81, 372/55, 64, 38

[56] References Cited

U.S. PATENT DOCUMENTS

| | | | |
|---|---|---|---|
| 3,994,430 | 11/1976 | Cusano et al. | 228/122 |
| 4,169,251 | 9/1979 | Laakmann | 372/82 |
| 4,363,126 | 12/1982 | Chenausky et al. | 372/38 |
| 4,373,202 | 2/1983 | Laakmann et al. | 372/64 |
| 4,455,658 | 6/1984 | Sutter, Jr. | 372/38 |
| 4,493,087 | 1/1985 | Laakmann et al. | 372/64 |
| 4,710,941 | 12/1987 | Sluss et al. | 372/87 |
| 4,805,182 | 2/1989 | Laakmann | 372/82 |
| 4,837,772 | 6/1989 | Laakmann | 372/82 |
| 4,849,981 | 7/1989 | Toda | 372/38 |
| 5,008,894 | 4/1991 | Laakmann | 372/38 |

OTHER PUBLICATIONS

Liao, Samuel Y., *Microwave Devices and Circuits*, 2d ed., Prentice–Hall, Inc., Englewood Cliffs, NJ, 1985, pp. 467–480.

*Primary Examiner*—Leon Scott, Jr.
*Attorney, Agent, or Firm*—Seed and Berry LLP

[57] ABSTRACT

A compact drive system drives an RF-excited gas laser to produce laser energy. The drive system is implemented on a ceramic circuit board having a high dielectric constant. The drive system includes an RF energy source that produces RF energy that is transmitted by a quarter-wave transmission line to the plasma tube of the laser. The transmission line is a microstrip transmission line having a conductive strip and a conductive ground plane bonded to opposite sides of the ceramic circuit board. Such a microstrip transmission line enables the entire drive system to be implemented on the ceramic circuit board. The drive system includes a feedback path to the input of the RF energy source transistor, which enables the drive system to be self-oscillating in that the frequency of the RF energy produced is maintained equal to the resonant frequency of the laser.

21 Claims, 3 Drawing Sheets

RF-EXCITED GAS LASER SYSTEM

TECHNICAL FIELD

The present invention relates to lasers and, more particularly, to drive systems for radio frequency excited gas lasers.

BACKGROUND OF THE INVENTION

A radio frequency (RF)-excited gas laser produces laser energy when a gas medium within the laser is excited by radio frequency voltages between a pair of electrodes. The RF energy is delivered to the laser electrodes by a drive system that includes an RF energy source and a transmission line. One problem that should be considered in the design of the drive system is that the impedance of the electrodes of the laser is typically much higher (200–2,000 ohms) than the input impedance of the RF energy source (approximately 5 ohms). In addition, the impedance of the laser typically is initially 1,000–2,000 ohms before the gas medium in the laser is ignited and approximately 200 ohms after ignition.

Prior art drive systems often employ a 50 ohm coaxial transmission line with separate matching networks at each end of the transmission line. The matching network between the RF energy source and the transmission line steps the source impedance up to the 50 ohm line impedance. The matching network between the transmission line and the laser steps up the transmission line impedance to the impedances of the laser. Such prior art matching networks are needlessly complicated and fail to account for the high impedance and frequency of the laser prior to breakdown of the gas medium.

One system that overcomes some of the problems of prior art drive systems for RF-excited gas lasers is disclosed in U.S. Pat. No. 4,837,772 (the '772 patent) to Laakmann. The system shown in the '772 patent includes a lumped constant matching system connected directly between a transistor of the RF energy source and the laser. In addition, the '772 patent discloses a coaxial cable connecting the laser to the input of the RF energy source transistor to create a feedback path. Such a system is "self-oscillating" in that the RF energy source transistor will oscillate initially at a frequency that generates the maximum voltage across the laser electrodes to ignite the laser gas and automatically readjusts its frequency via the feedback path to match the resonant frequency of the laser after the gas medium ignites.

Another system for overcoming some of the problems of prior art RF-excited gas lasers is disclosed in U.S. Pat. No. 5,008,894 (the '894 patent) to Laakmann. The '894 patent employs a quarter wave coaxial transmission line between the RF energy source and the laser. In addition, the RF energy source includes two transistors in a push-pull configuration that enables the use of a standard 50 ohm transmission line. Such a quarter wave transmission line enhances the break-down of the gas medium, increases laser efficiency, and stabilizes the laser discharge.

Although the systems shown in the '772 patent and the '894 patent alleviate some of the impedance matching problems of the prior art, those prior art systems can still be improved upon. In particular, the coaxial transmission lines employed by those systems are relatively bulky. Further, neither patent suggests a method of incorporating the laser drive system, including the transmission line, onto a printed circuit board. In addition, the '894 patent does not teach how to combine its quarter wave transmission line with the feedback path and single transistor of the '772 patent to provide the advantages of both systems. Moreover, the single power transistor of the '772 patent creates even harmonics that cause additional currents to flow in the transmission line, which can be a problem when using the lossy transmission lines of the prior art.

SUMMARY OF THE INVENTION

The present invention is directed to a compact drive system for driving an RF-excited gas laser. In a preferred embodiment, the drive system is implemented on a ceramic circuit board having a high dielectric constant. The drive system includes an RF energy source that produces RF energy that is transmitted by a transmission line to the plasma tube of the laser. The transmission line is a microstrip transmission line having an electrically conductive strip bonded to the ceramic circuit board with an electrically conductive ground plane bonded to the opposite side of the circuit board from the conductive strip. Such a microstrip transmission line enables the entire drive system to be implemented on the ceramic circuit board. In addition, such a microstrip transmission line enables the drive system to produce less heat and stray radiation than prior art drive systems.

In the preferred embodiment, the drive system includes a quarter wave transmission line and a feedback path from the laser to the input of a single RF energy source transistor. Such a feedback path enables the drive system to be "self-oscillating" in that the frequency of the RF energy produced is equal to the resonant frequency of the laser. The feedback path enables the drive system to match the resonant frequency of the laser which initially is a first frequency to ignite the laser gas and then changes to a second frequency after the laser gas is ignited. The quarter wave transmission line enhances the break-down of the gas medium, increases laser efficiency, and stabilizes the laser discharge.

DETAILED DESCRIPTION OF THE INVENTION

The present invention is directed to a compact drive system for driving an RF-excited gas laser. In a preferred embodiment, the drive system is implemented on a circuit board having a high dielectric constant. The drive system includes an RF energy source that produces RF energy transmitted by a quarter wave transmission line to the plasma tube of the laser. The transmission line is a microstrip transmission line having a conductive strip and a ground plane bonded to opposite sides of the ceramic circuit board. Such a microstrip transmission line enables the entire drive system to be implemented on the dielectric circuit board. Preferably, the drive system includes a feedback path from the laser to the input of the RF energy source transistor. Such a feedback path enables the drive system to be "self-oscillating" in that the frequency of the RF energy produced is maintained equal to the resonant frequency of the laser.

Figure 1:
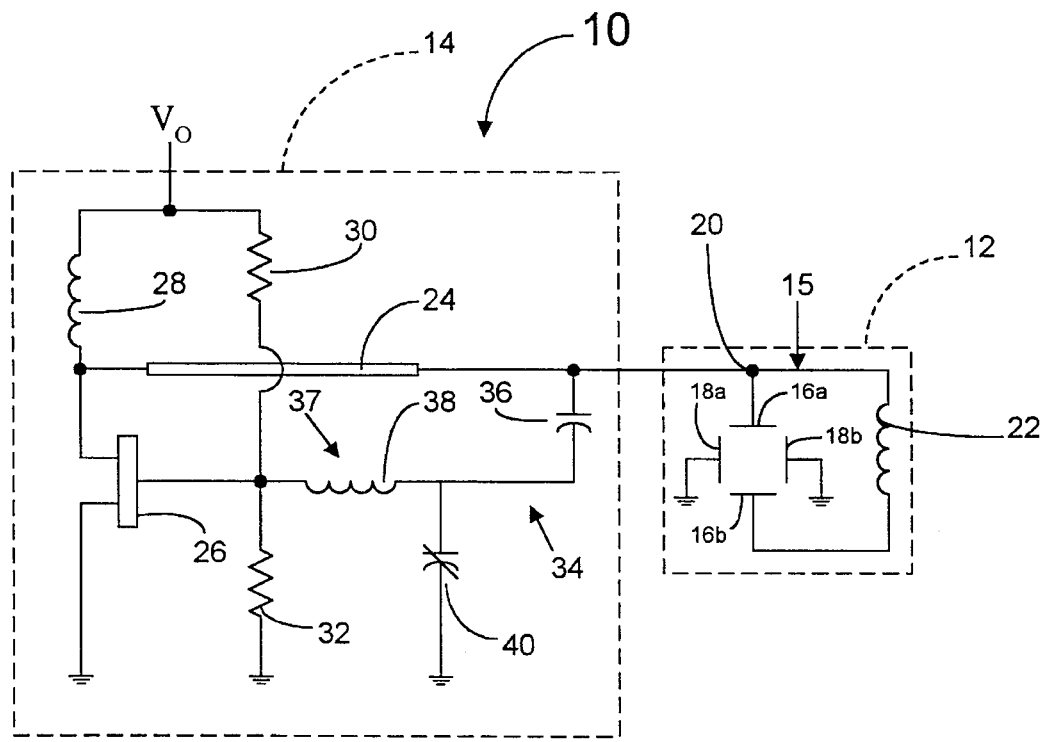
FIG. 1 is a circuit diagram of an RF-excited gas laser system according to the present invention.

A circuit diagram of an RF-excited gas laser system 10 according to a preferred embodiment of the present invention is shown in FIG. 1. The laser system 10 includes a laser plasma tube 12 connected to a drive system 14 implemented on a dielectric circuit board shown in FIGS. 2 and 3. The plasma tube 12 includes an elongated enclosed chamber that is filled with a gas medium, such as carbon dioxide. The gas medium is ignited by the application of RF energy received from the drive system 14, thereby producing laser energy.

The plasma tube 12 includes a discharge circuit 15 having two pairs of discharge electrodes, pair 16A, 16B and pair 18A, 18B. The electrodes are arranged in a square configuration with the electrodes in each pair of electrodes positioned diametrically opposite the other within the plasma tube 12. The electrode 16A is connected to a plasma tube input terminal 20 and the electrode 16B is connected to the electrode 16A through an inductance coil 22. The inductance coil 22 neutralizes capacitive reactance and generates biphase excitation, as explained in U.S. Pat. No. 4,837,772, which is incorporated herein by reference.

Each of the electrodes 18A, 18B is electrically grounded. It will be appreciated that various other known laser plasma tube discharge circuits can be employed in conjunction with the present invention.

Figure 2:
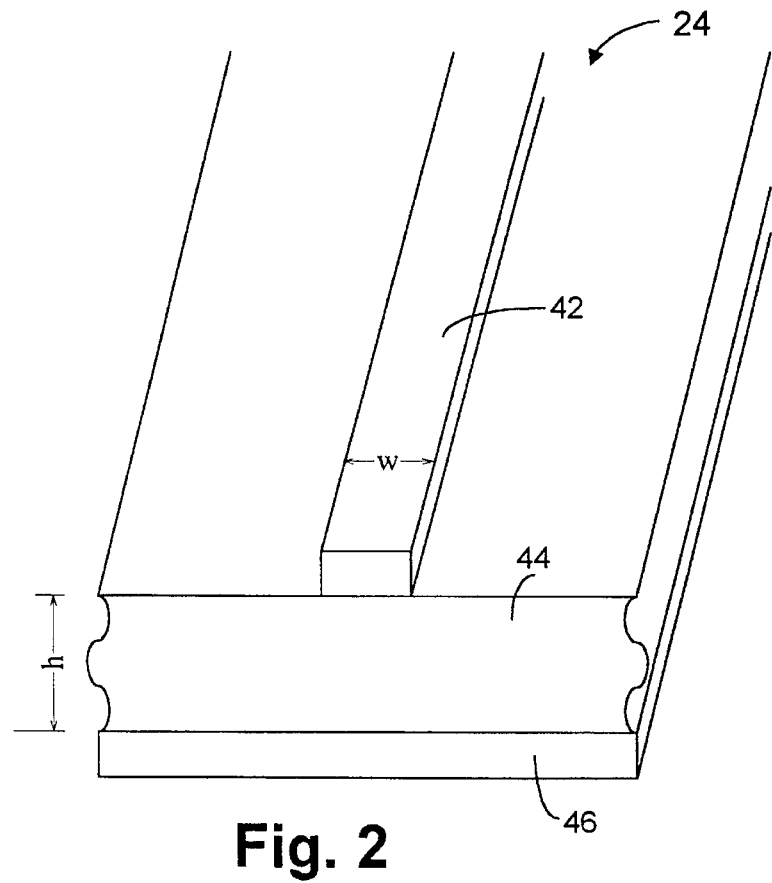
FIG. 2 is an isometric view of a microstrip transmission line used in the system of FIG. 1.
Figure 3:
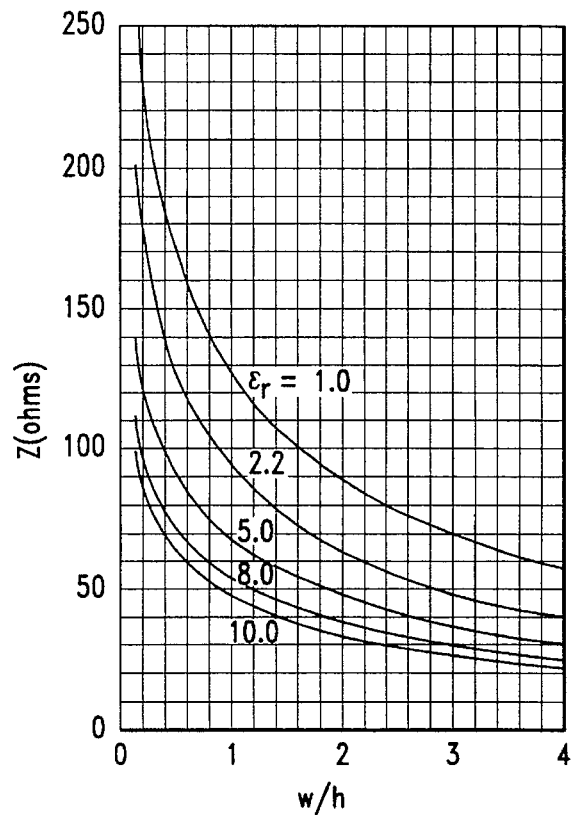
FIG. 3 is a graph showing the characteristic impedances of various microstrip transmission lines.

The drive system 14 of the present invention greatly improves upon the drive systems of prior art gas lasers by incorporating all of the drive system elements onto a dielectric circuit board (FIGS. 2–3). Prior art drive systems cannot be fully incorporated onto a circuit board because of their inclusion of a coaxial transmission line connecting the RF energy source to the laser plasma tube. The present invention overcomes the size disadvantage of prior art drive systems by including in the drive system 14 a microstrip transmission line 24, rather than a coaxial transmission line. In addition to being much smaller than a prior art coaxial transmission line, the microstrip transmission line 24 is much more versatile in that the characteristic impedance of the microstrip transmission line is easily adjusted for the exact impedance transformation desired between the plasma tube 12 and the drive system 14. The microstrip transmission line 24 can be easily designed to have an electrical length substantially equal to a quarter wavelength at the operating frequency of the plasma tube 12, and thus, provide many of the same functional advantages as the quarter wave coaxial transmission line disclosed in U.S. Pat. No. 5,008,894, which is incorporated herein by reference.

The high controllability of the microstrip transmission line 24 enables the drive system 14 to be further simplified by using a single power transistor 26. Preferably the power transistor 26 is a MOSFET transistor because of the better power handling capability, higher input impedance, and higher gain characteristic of MOSFET transistors compared to the junction transistors used in the prior art drive systems. The microstrip transmission line 24 is connected directly between the source of the power transistor 26 and the discharge circuit 15 of the plasma tube 12. An inductor 28 is connected between the source of the power transistor 26 and a voltage source $V_o$. The inductor 26 is an RF choke at the operating frequency of the plasma tube 12 and applies DC voltage to the power transistor 26.

The drive system 14 also includes a resistor 30 connected between the voltage source $V_o$ and the gate of the power transistor 26 and a resistor 32 connected between the gate and ground. The resistors 30, 32 provide quiescent bias in order to provide the initial gain for the start of oscillations.

It will be appreciated that the power transistor 26 operates as an oscillator that produces RF energy when the appropriate voltage is applied to the gate of the power transistor. The appropriate voltage at the gate of the power transistor 26 is applied by the voltage source $V_o$ via the resistors 30, 32. The voltage source $V_o$ can be a standard voltage regulator such as a regulator of the conventional simple series inductance, step-down type. The RF energy produced by the power transistor 26 is transmitted by the microstrip transmission line 24 to the plasma tube 12 which causes the plasma tube to produce laser energy.

An additional advantage provided by the drive system 14 is that it is "self-oscillating." The drive system 14 is self-oscillating in that the drive system 14 supplies RF energy to the plasma tube 12 at a frequency at which the impedance at the input terminal 20 is at a maximum. This generates the maximum voltage across the electrodes 16A–18B which is precisely the condition that maximizes the ignition of the laser gas medium between the electrodes. After the gas medium ignites and thereby reduces its impedance and lowers its operating frequency, the drive system 14 automatically adjusts its parameters for substantially maximum voltage across the discharge electrodes 16A–18B.

The drive system 14 is made self-oscillating by employing a feedback path 34 with a feedback capacitor 36 between the plasma tube input terminal 20 and the gate of the power transistor 26. The feedback path 34 is coupled to the power transistor 26 via a pi network 37 formed by an inductor 38 and a capacitor 40. The pi network 37 steps up the input impedance of the power transistor 26, which is mostly capacitive at the typical operating frequency of 46 MHz. In addition, the pi network 37 resonates the input capacitance and forms a low Q circuit having a real input impedance. Together the feedback capacitor 36 and pi network 37 create a 90° phase lead which compensates for a 90° phase shift caused by the quarter-wavelength microstrip transmission line 24. To create such a 90° phase lead, the inductor 38 and capacitor 40 are chosen to provide a real input impedance of approximately 100 ohms while the feedback capacitor 36 is chosen to have an impedance of approximately 1,000–2,000 ohms. As a result, the feedback path 34 achieves in-phase feedback and above-unity gain to produce oscillations substantially at the resonance frequency of the plasma tube 12.

It will be appreciated that the conditions for steady state oscillation in a closed loop are that the total phase shift is zero. The circuit contains three elements that produce phase shift as a function of frequency: the laser tube discharge circuit 15, the microstrip transmission line 24, and the feedback path 34 formed by the capacitor 36 and the pi network 37. Both the feedback path 34 and the microstrip transmission line are relatively low Q elements, each having a slow change of phase shift with frequency. In contrast, the laser tube discharge circuit 15 has a Q varying between about 15 when ignited and 300 before breakdown of the laser gas medium, thereby generating more rapid phase shift. In addition, the ignition of the laser gas medium causes a lowering of the resonant frequency of the plasma tube 12. It can therefore be seen that the operating frequency will always be very close to resonance frequency of the plasma tube 12, independent of the state of the laser gas medium. This is borne out in practice.

A partial cutaway view of the microstrip transmission line 24 is shown in FIG. 2. The microstrip transmission line 24 includes a strip conductor 42 bonded to a dielectric circuit board 44 mounted on an electrically conductive ground plane 46. The strip conductor 42 and the ground plane 46 can be made of any of numerous electrically conductive materials, such as copper. The dielectric circuit board 44 can be made of any dielectric material, but preferably alumina is used because of its good thermal performance.

Normally, prior art RF and microwave integrated circuits designed on ceramic materials use thin, evaporated metals known as "thin films." Because of their small skin depth, typically less than $10^{-4}$ inches, such relatively thin films are suitable for RF and microwave circuits. However, such thin films pose a problem in attaching the power semiconductors by means of soldering. When attempting to solder in typical commercial RF power devices with dissipation ratings of 100 to 300 watts, the metalization is destroyed or damaged, making the replacement of the RF power transistor 26 impossible when using thin films.

One technology that has been developed for rugged dc and low frequency circuit applications, particularly in the automotive field, is called "Direct Bond Copper (DBCU)." DBCU is described in several patents issued to General Electric, as exemplified by U.S. Pat. No. 3,994,430, which is incorporated herein by reference. The inventor of the present invention contacted the few vendors licensed by GE to use the DBCU technology, and those vendors were very skeptical initially to use of the technology with high frequency circuits, such as microwave and RF circuits. The vendors were skeptical because the DBCU technology had previously been considered and found unsuitable for standard microwave and RF use. The vendors found the DBCU technology unsuitable for RF and microwave use because of the significant conductor height and the conductor roughness resulting from the etching process that is used to define the connecting traces.

Contrary to the expectations of the GE vendors with experience in the DBCU process, the present inventor discovered that the DBCU process can be used to fabricate the RF drive system 14, including the microstrip transmission line 24, of the present invention. The inventor discovered that the expected lack of precision caused by edge roughness could be minimized for the 40–50 MHz region used in the present invention by making the strip conductor 42 and the connecting traces of the drive circuit 14 relatively wide (e.g., 0.1 inches) compared to their depth (e.g., 0.006–0.012 inches). With such wide connecting traces and a wide strip conductor 42, the edge contribution in terms of roughness and lack of precision is insignificant.

To fabricate the microstrip transmission line 24, relatively thick sheets of copper (0.006–0.012 inches) are bonded by DBCU to opposite faces of the ceramic substrate 44. The DBCU process places each copper sheet adjacent the ceramic substrate 44 and a bonding agent, such as oxygen, is introduced between each copper sheet and the ceramic substrate. The copper sheets and bonding agent are heated to form eutectic alloys at the interfaces between the copper sheets and the ceramic substrate 44 at a temperature between the eutectic temperature of the eutectic alloy and the melting point of the copper sheets. The copper sheets and the ceramic substrate subsequently are cooled to form a direct bond between each copper sheet and the ceramic substrate. The copper sheets are then etched as needed by conventional techniques to form the strip conductor 42, the ground plane 46, and any traces needed to connect the components of the drive system 14 to the strip conductor 42. This technology provides traces with enough mechanical ruggedness to withstand repeated soldering operations as needed.

In the preferred embodiment, the DBCU technology is used to bond a copper strip conductor 42 to an alumina circuit board substrate 44. However, ceramics with higher dielectric constants, such as Barium Titanate (S 8500 from Transtec), enable the microstrip transmission line to be shortened even further. However, such high dielectric ceramics are more expensive and not as developed as alumina. Similarly, other metals could be employed for the strip conductor 42, but copper is preferable. Production fabrication processes for DBCU include photolithography and specialized etching of the traces in order to minimize trace taper. Laser drilling and cutting of the ceramic is used. For prototype fabrication, the inventor has found NC milling of the copper (within about 0.001 of the ceramic substrate) and a subsequent light clean up etch useful.

In addition to the microstrip transmission line 24, several of the components of the drive system 14, such as the resistors 30, 32, feedback capacitor 36, and feedback inductor 38, can be printed directly on the circuit board 44 using known circuit printing techniques to form an integrated circuit. The inductor 28 and the tuning capacitor 40 are best used in discrete form because the inductor 28 is too large to be printed and the capacitor 40 needs to be adjustable to tune out variances between different implementations of the plasma tube 12 and the power transistor 26.

The microstrip transmission line 24 should be designed to match the load impedance (r) of the power transistor 26 to the impedance (R) at the input terminal 20 of the plasma tube 12. The impedance R at the input terminal 20 of the plasma tube 12 averages approximately 200 ohms after the plasma tube is ignited, as disclosed in the 5,008,894 patent. The 200 ohm impedance occurs when the laser tube 12 has a square bore of 4.8 mm, contains a laser gas at a pressure of 60 torr, and each of the discharge electrodes 16A–18B is 37 cm long. These plasma tube parameters are appropriate to operate the gas laser system 10 at resonance with the input power (P) delivered to the plasma tube 12 being approximately 110 W. When the laser gas medium is $CO_2$, the 110 W input power corresponds to a continuous wave (CW) laser output power of approximately 15 W.

The load impedance r needed to deliver the input power P can be computed using the equation $r=V^2/P$ where V is the RMS voltage output by the power transistor 26. In a preferred embodiment, the output voltage of the power transistor 26 is approximately 19.8 volts RMS. As a result, the load impedance r needed to deliver the 110 W of input power P to the plasma tube 12 is approximately 3.56 ohms, ($19.8^2/110$).

The characteristic impedance (Z) of the microstrip transmission line 24 needed to match the impedance R of the plasma tube 12 with the load impedance r of the power transistor 26 is equal to the geometric mean of the load resistance r and plasma tube impedance R, i.e., $Z=\sqrt{rR}$. As discussed above, the impedance R of the laser tube electrodes averages about 200 ohms after the gas medium in the laser tube 12 is ignited and the load impedance r equals 3.56 ohms. Thus, the characteristic impedance Z of the microstrip transmission line 24 needed to match the impedances is approximately 26.7 ohms ($\sqrt{3.56\times200}$).

The characteristic impedance (Z) of the microstrip transmission line 24 depends upon the relative dielectric constant ($\epsilon_r$) and the height (h) of the dielectric circuit board 44 and the width (w) of the strip conductor 42, as shown in FIG. 3. Thus, in order to design the dimensions of the microstrip transmission line 24, the material to be used as the dielectric circuit board 44 must be selected. The length of the microstrip transmission line 24, and consequently the size of the drive system 14, can be minimized by employing a material with a high dielectric constant as the dielectric circuit board 44. That is because the wavelength through a dielectric material is reduced compared to the wavelength through air by a dielectric velocity factor equal to the square root of the dielectric constant $e_r$. The one-quarter wavelength of a transmission line through an air substrate would be equal to one-quarter times the speed of light divided by the frequency of the transmission through the transmission line. Thus, at the typical operating frequency of 46 MHz, one-quarter wavelength through air equals 64 inches. One-quarter wavelength for a microstrip transmission line is reduced by a shortening factor $\sqrt{\epsilon_{eff}}$ which can be obtained using the graph shown in FIG. 4.

Figure 4:
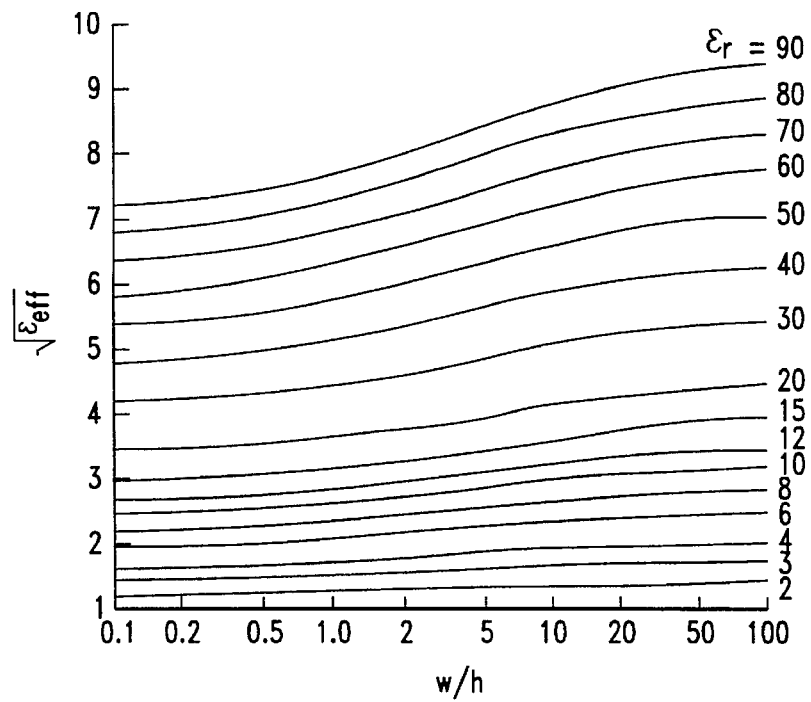
FIG. 4 is a graph showing shortening factors for various microstrip transmission lines.

Using FIGS. 3 and 4, the dimensions of the microstrip transmission line 24 can be selected to obtain the desired quarter-wavelength transmission line. In the preferred embodiment, the dielectric circuit board 44 is made of alumina, which has a dielectric constant of 9.5. For an alumina circuit board and a desired characteristic impedance of 26.7 ohms (as computed above), FIG. 3 shows that the w/h ratio should equal approximately 2.86. To achieve the desired w/h ratio, the preferred embodiment employs a strip conductor 42 that is 0.10 inches wide (w) and 0.035 inches thick (h). For an alumina circuit board 44 with a dielectric constant ($e_r$) of 9.5 and a w/h ratio of 2.86, FIG. 4 shows a shortening factor $\sqrt{\epsilon_{eff}}$ of 2.67. As a result, for the typical operating frequency of 46 MHz, the length of the microstrip transmission line 24 would be 24 inches (64/2.67) in order to equal one-quarter wavelength.

Figure 5:
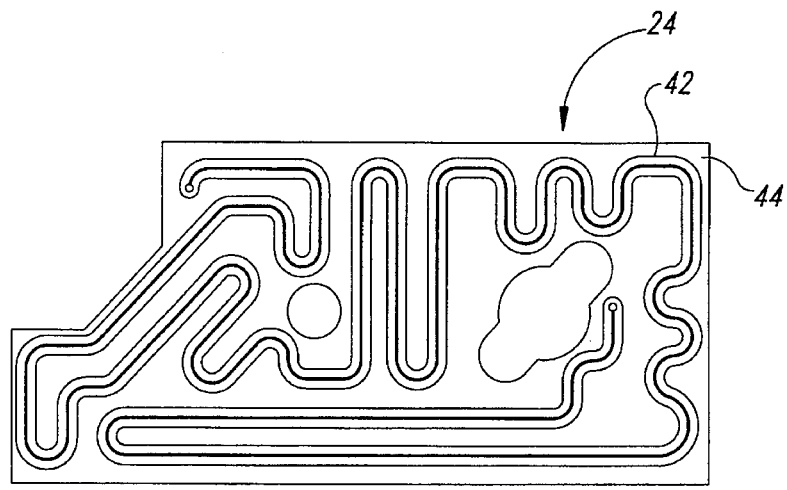
FIG. 5 is an elevational view of the microstrip transmission line of FIG. 2.

A preferred embodiment of the RF driver circuit board, including the quarter wave transmission line 24 is implemented on an alumina board as shown in FIG. 5. The 25 ohm transmission line 24 is wrapped in snake-like fashion around the available area on the circuit board 44 which has maximum dimensions of 2×4.2 inches. The strip line layout has been computer modeled to overcome the limitation of approximate graphs shown in FIGS. 3 and 4. Using the circuit board shown in FIG. 5, the feedback capacitor 36 has been integrated into the board layout. All other components of the drive system 14 are discrete and are mounted on pads integrated into the layout.

Figure 6:
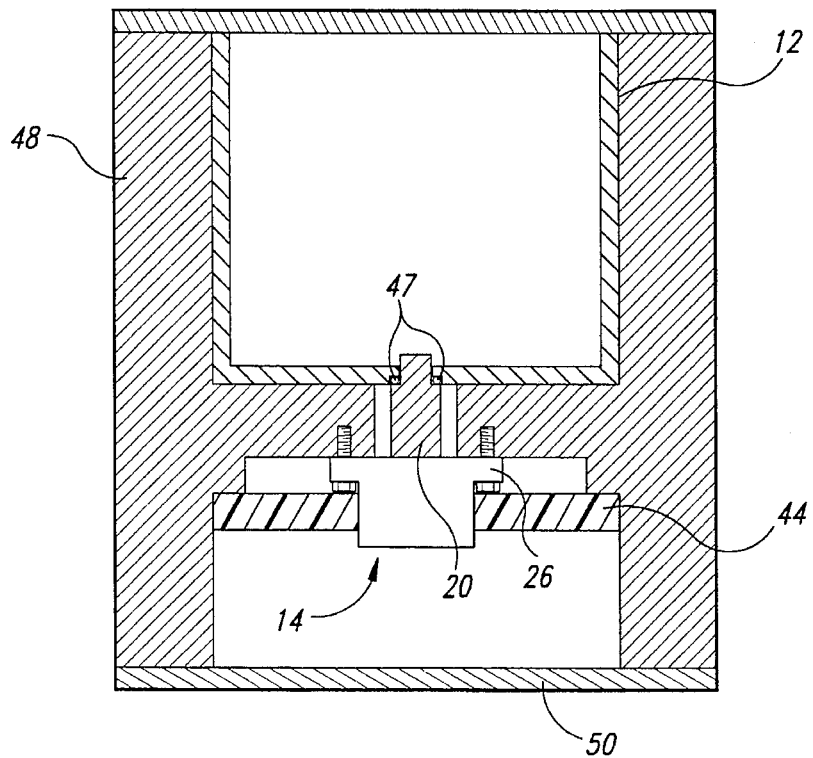
FIG. 6 is a cross-sectional view of the system of FIG. 1.

In a preferred embodiment of the gas laser system 10, the drive system 14 is positioned immediately adjacent the plasma tube 12 as shown in FIG. 6. The electrode terminal 20 extends into the plasma tube 12 and is sealed to the plasma tube 12 by an O-ring seal 47. Because the microstrip transmission line 24 enables the drive system 14 to be so small, a single heat sink 48 can be used to dissipate the heat from both the drive system 14 and the plasma tube 12. The heat sink 48 preferably directly contacts the dielectric circuit board 44 and the plasma tube 12 in order to dissipate the heat produced in both the plasma tube and the drive system 14 and to support the plasma tube. In addition, the power transistor 26 screws directly into the heat sink 48 so that the heat sink supports and dissipates the heat produced by the power transistor. The entire drive system 14 is shielded and enclosed by an Rfi enclosure 50. Such a common heat sink 48 would be impractical if use was attempted with the much larger prior art drive systems.

It will be appreciated that the design of the drive system 14 provides advantages over prior art drive systems for at least the following reasons.
1. The reduced length of the microstrip transmission line 24 compared to prior art coaxial transmission lines reduces the size of the drive system 14, and thus, the gas laser system 10.
2. The reduced length of the microstrip transmission line 24 reduces resistive losses (i.e., produces less heat) and stray radiation.
3. The microstrip transmission line 24 can generate non-standard line impedances as well as discontinuities and non-uniform (tapering) characteristic impedances for increased design freedom and matching of active devices. Such impedance control is effected by adjusting the dimensions and/or dielectric constant of the microstrip transmission line 24.
4. The high thermal conductivity of the dielectric circuit board 44 compared to prior art drive systems enables the temperature rise caused by residual losses to be minimized, thereby achieving increased circuit reliability.
5. The microstrip transmission line 24, and the resulting drive system 14, is much less expensive than prior art RF drive systems.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

I claim:

1. An RF-excited gas laser system, comprising:
  a plasma tube having an electrical input port and a discharge section, that together produce laser energy when supplied with RF energy, the input port having an impedance at an operating frequency;
  an RF energy source having a source impedance lower than the plasma tube impedance at the operating frequency and producing RF energy; and
  a microstrip transmission line having an input end and an output end, the input end being connected to the RF energy source and the output end being connected to the plasma tube input port, the microstrip transmission line including a dielectric substrate coupled between a strip conductor and a ground plane and having an impedance intermediate the source impedance and the plasma tube impedance, the microstrip transmission line transmitting power to the plasma tube at the operating frequency.

2. The RF-excited gas laser system of claim 1 wherein the RF energy source is self-oscillating such that the RF energy source oscillates at an input frequency substantially equal to the operating frequency at which the plasma tube resonates.

3. The RF-excited gas laser system of claim 2 wherein the RF energy source initially supplies the RF energy at a first frequency that generates a voltage across the discharge section sufficient to ignite gas in the discharge section and after the gas is ignited, supplies the RF energy at a second frequency lower than the first frequency to produce the laser energy.

4. The RF-excited gas laser system of claim 2 wherein the RF energy source includes an input node and an output node, the output node being connected to the input end of the microstrip transmission line, the input being connected to the plasma tube input port to form a feedback loop and thereby make the RF energy source self-oscillating.

5. The RF-excited gas laser system of claim 2 wherein the RF energy source includes an amplifier with an input derived by feedback from the plasma tube.

6. The RF-excited gas laser system of claim 1 wherein the dielectric substrate is ceramic.

7. The RF-excited gas laser system of claim 1 wherein the discharge section of the plasma tube includes electrodes, the system further including:
  a resonant circuit coupled to the discharge section electrodes, the resonant circuit being resonant at the operating frequency of the plasma tube.

8. The RF-excited gas laser system of claim 1 wherein the strip conductor is direct-bonded to the dielectric substrate by steps that include:
  placing the strip conductor adjacent the dielectric substrate to form an interface between the strip conductor and the dielectric substrate;
  contacting a bonding agent to the strip conductor, the bonding agent being a material that forms a eutectic alloy with the strip conductor at a eutectic temperature lower than the melting point of the strip conductor;
  heating the strip conductor and bonding agent to a temperature between the eutectic temperature of the eutectic alloy and the melting point of the strip conductor to form a melt at the interface between the strip conductor and the dielectric substrate; and
  cooling the melt to form a direct bond between the strip conductor and the dielectric substrate.

9. The RF-excited gas laser system of claim 8 wherein the placing step includes placing a sheet of metal adjacent the dielectric substrate and further including etching the metal sheet to produce the strip conductor.

10. The RF-excited gas laser system of claim 8, further including direct-bonding a metal sheet to a side of the dielectric substrate opposite to the strip conductor, the metal sheet thereby acting as a ground plane for the microstrip transmission line.

11. The RF-excited gas laser system of claim 1, further comprising:
  a matching circuit connected between the RF energy source and the microstrip transmission line, the matching circuit having an impedance intermediate the source impedance and the transmission line impedance and a capacitance selected to compensate for a phase shift caused by the microstrip transmission line.

12. The RF-excited gas laser system of claim 11 wherein the dielectric substrate is a circuit board and the RF energy source and the matching circuit are formed in or mounted on the circuit board.

13. An RF-excited gas laser system, comprising:
  a plasma tube having an electrical input port, a discharge section, and an optical resonator that together produce the laser energy when supplied with RF energy, the input port having an impedance at an operating frequency;
  a non-balanced RF energy source including a single power transistor with an input connected to the plasma tube input port and an output that supplies RF energy, the RF energy source having a source impedance lower that the plasma tube impedance at the operating frequency; and
  a transmission line connected at an input end to the RF energy source and connected at an output end to the plasma tube input port, the transmission line having an electrical length substantially equal to an odd number of quarter wavelengths at the operating frequency and having an impedance intermediate the source impedance and the plasma tube impedance.

14. The RF-excited gas laser system of claim 13 wherein the transmission line includes a microstrip transmission line having a strip conductor bonded to a dielectric substrate, the strip conductor having a width and a thickness and the dielectric substrate having a height and a dielectric constant, the impedance of the transmission line being based on the dielectric constant and height of the dielectric substrate and on the width of the strip conductor.

15. The RF-excited gas laser system of claim 13, further comprising:
  a feedback circuit connected between the input of the RF energy source and the output of the transmission line, the feedback circuit having an impedance and a capacitance selected to compensate for a phase shift caused by the transmission line.

16. An RF-excited gas laser system, comprising:
  a plasma tube having an electrical input port, a discharge section, and an optical resonator that together produce the laser energy when supplied with RF energy, the input port having an impedance at an operating frequency; and
  a drive system implemented on a dielectric circuit board, the drive system including:
    an RF energy source having a source impedance lower than the plasma tube impedance at the operating frequency and producing RF energy; and
    a microstrip transmission line having an input end and an output end, the input end being connected to the RF energy source and the output end being connected to the plasma tube input port, the microstrip transmission line including a conductive strip bonded to the dielectric circuit board and having an impedance selected to allow transmission of peak power to the plasma tube at the operating frequency.

17. The RF-excited gas laser system of claim 16 wherein the conductive strip is direct-bonded to the dielectric circuit board by a thin eutectic layer formed by heating the conductive strip in the presence of a bonding agent.

18. The RF-excited gas laser system of claim 16 wherein the RF energy source includes an input node and an output node, the output node being connected to the input end of the microstrip transmission line and the input node being connected to the plasma tube input port to form a feedback loop and thereby make the RF energy source self-oscillating.

19. The RF-excited gas laser system of claim 18, further comprising:
  a feedback circuit connected between the input of the RF energy source and the output of the transmission line, the feedback circuit being structured to provide a phase shift opposite to a phase shift caused by the transmission line.

20. The RF-excited gas laser system of claim 19 wherein the feedback circuit is mounted on the circuit board.

21. The RF-excited gas laser system of claim 16, further including:
  a heat sink directly contacting the circuit board and the laser tube so that the heat sink absorbs heat from both the circuit board and the laser tube.

* * * * *